United States Patent
Durante Spigolon et al.

(10) Patent No.: US 12,499,567 B2
(45) Date of Patent: Dec. 16, 2025

(54) METHOD FOR GENERATING A THREE-DIMENSIONAL DIGITAL MODEL OF A DRILL CORE AND COMPUTER-READABLE STORAGE MEDIA

(71) Applicants: PETRÓLEO BRASILEIRO S.A.—PETROBRAS, Rio de Janeiro (BR); UNIVERSIDADE DO VALE DO RIO DOS SINOS—UNISINOS, São Leopoldo (BR)

(72) Inventors: Andre Luiz Durante Spigolon, Rio de Janeiro (BR); Mauricio Roberto Veronez, São Leopoldo (BR); Leandro Tonietto, Montenegro (BR); Luiz Gonzaga Da Silveira Junior, Porto Alegre (BR); Ygor Dos Santos Rocha, Rio de Janeiro (BR); Alysson Soares Aires, São Leopoldo (BR)

(73) Assignees: PETRÓLEO BRASILEIRO S.A.—PETROBRAS, Rio de Janeiro (BR); UNIVERSIDADE DO VALE DO RIO DOS SINOS—UNISINOS, São Leopoldo (BR)

( * ) Notice: Subject to any disclaimer, the term of this patent is extended or adjusted under 35 U.S.C. 154(b) by 0 days.

(21) Appl. No.: 18/981,201

(22) Filed: Dec. 13, 2024

(65) Prior Publication Data
US 2025/0200779 A1    Jun. 19, 2025

(30) Foreign Application Priority Data
Dec. 14, 2023    (BR) .......................... 1020230263909

(51) Int. Cl.
*G06T 7/593*    (2017.01)
*G01V 20/00*    (2024.01)
(Continued)

(52) U.S. Cl.
CPC .............. *G06T 7/593* (2017.01); *G01V 20/00* (2024.01); *G06T 7/579* (2017.01); *G06T 15/04* (2013.01);
(Continued)

(58) Field of Classification Search
None
See application file for complete search history.

(56) References Cited

U.S. PATENT DOCUMENTS 12,254,570 B2 *  3/2025  Bi ........................ G06T 17/205
2020/0342688 A1 * 10/2020  Park ....................... G06T 15/04

FOREIGN PATENT DOCUMENTS

| CA | 3239336 A1 * | 6/2023 | ............. E21B 10/04 |
| WO | WO-2005121783 A1 * | 12/2005 | ......... G01N 15/0227 |
| WO | WO-2015126369 A1 * | 8/2015 | ............. G01N 23/20 |

* cited by examiner

*Primary Examiner* — Gelek W Topgyal
(74) *Attorney, Agent, or Firm* — Kilpatrick Townsend & Stockton LLP

(57) ABSTRACT

The present invention relates to a method for generating a three-dimensional digital model of a drill core, comprising the steps of positioning at least one drill core fragment in an acquisition scenario; capturing images of the drill core fragment; generating a mask for each captured image; reconstructing the position and angle of the image; generating at least one dense point cloud; generating at least one polygonal mesh; georeferencing the drill core fragment; performing texture processing; and unifying a plurality of drill core fragments into a single three-dimensional object.

12 Claims, 5 Drawing Sheets

(51) Int. Cl.
 *G06T 7/579* (2017.01)
 *G06T 15/04* (2011.01)
 *H04N 13/111* (2018.01)
 *H04N 13/221* (2018.01)
(52) U.S. Cl.
 CPC ......... *H04N 13/111* (2018.05); *H04N 13/221* (2018.05); *G06T 2207/10012* (2013.01); *G06T 2207/10028* (2013.01); *G06T 2210/56* (2013.01)

METHOD FOR GENERATING A THREE-DIMENSIONAL DIGITAL MODEL OF A DRILL CORE AND COMPUTER-READABLE STORAGE MEDIA

CROSS-REFERENCES TO RELATED APPLICATIONS

This application claims the benefit of priority to Brazilian Patent Application No. BR 1020230263909 filed Dec. 14, 2023, the contents of which are hereby incorporated by reference in their entirety for all purposes.

FIELD OF THE INVENTION

The present invention is part of the technical field of modeling, simulation and evaluation of reservoirs. In particular, the present invention relates to a method for generating a three-dimensional digital model of a drill core.

BACKGROUNDS OF THE INVENTION

Over the last two decades, the technological field of geosciences has been undergoing a digital revolution, boosted by technological advances in processing hardware and remote sensing equipment.

One of the techniques responsible for this revolution is photogrammetry, known as Structure from Motion/Multi-View Stereo (SfM/MVS), which is capable of creating a three-dimensional (3D) model of a surface based on photographs captured with a high overlap between the same and the aid of computer vision algorithms.

These technological advances were responsible for popularizing the generation of Digital Outcrop Models (DOMs) in geological studies, which are characterized by data from 3D digital representations of rock structures present on the Earth's surface, which are essential for studies such as reservoir characterization and geological modeling, very common in the oil and gas industry.

In addition, data from 3D digital representations of rock structures allow studies and activities, which until then were carried out exclusively on site, to also be feasible in a digital environment, bringing the feasibility of integrating different data sources, in a scalar and multidisciplinary way.

In this sense, associated with DOMs, it is also common to study drill cores. The drill cores are cylindrical rock samples, recovered by drilling techniques, capable of sampling an extensive one-dimensional profile of the subsurface.

Just like the digitization of outcrops, the digitization of drill cores brings similar benefits, allowing the analysis and the interpretation of data in a digital environment.

In addition, the digitization of drill core samples also offers the advantage of preserving this material in its integrity, since destructive laboratory tests are common in this context.

However, in the state of the art, there is a need for three-dimensional digitization of a drill core in a full manner, allowing its entire length to be viewed along the well. Furthermore, there is a clear need for a solution that can be portable.

STATE OF THE ART

Currently, there are solutions that propose the digitization of two-dimensional drill cores (2D, photographs) as well as in 3D (polygonal meshes). Most solutions focus on the digitization of drill cores arranged inside their storage boxes. This results in the loss of information in the order of 50% of the core surface, which is hidden inside the box.

On the other hand, there are some commercial devices that are capable of digitally reconstructing the entire cylindrical surface of the core, using a conveyor belt that rotates the material while simultaneously capturing photographs synchronized with the rotation of the sample. However, these devices do not provide for continuous core digitalization. In other words, for each captured fragment, an individual digital product is generated without the georeference context of the material. The fact that they are individual data and without georeference information makes it impossible: (i) to view the same simultaneously in a way that respects their true position and depth in the real world; and (ii) to integrate the same reliably with other data with spatial georeference, such as Digital Outcrop Model (DOM), geophysical sections, geological models, digital interpretations, among others.

Furthermore, with respect the devices currently used for digitalizing drill cores, it is noted that they have the limitation of being characterized as "laboratory" equipment, meaning that they need to be installed in a specific location for operation. This implies that all drill core that requires digitalization must be transported to the location where the equipment is installed, which may compromise its integrity if it is not packaged correctly during transportation The document INÊS, Márcio Adriano Mendes Contina. *Digitalização 3D por meio de fotogrametria: uma análise comparativa* (3D digitalization through photogrammetry: a comparative analysis). 2022. Doctoral Thesis. (https://hdl.handle.net/1822/83016) uses the SfM/MVS photogrammetry technique to generate 3D models of samples. However, such a document does not describe the full digital representation of a drill core in a three-dimensional digital model.

BRIEF DESCRIPTION OF THE INVENTION

According to a preferred embodiment of the present invention, a method is defined for generating a three-dimensional digital model of a drill core, comprising the steps of:
positioning at least one drill core fragment, perpendicularly, on the center of at least one rotating base of an acquisition scenario, obeying the original lower and upper positions of extraction of the drill core fragment from the reservoir;
wherein the original position of the base of the drill core fragment is arranged in contact with the surface of the rotating base;
wherein the rotating base is georeferenced by means of the north, east and altitude coordinates;
capturing images of the drill core fragment, wherein an image is captured every 15° of rotation of the rotating base axis;
generating a mask for each captured image, including exclusion of all information other than the drill core fragment within the image;
reconstructing the position and angle of the image;
generating at least one dense point cloud;
generating at least one polygonal mesh;
georeferencing the drill core fragment;
performing texture processing;
unifying a plurality of drill core fragments, including grouping the generated polygonal meshes into a single three-dimensional object within the same geographic reference system.

According to an additional embodiment of the present invention, the acquisition scenario has a cubic shape with one of the faces open, and comprises an artificial lighting system and at least one stably positioned camera.

According to another embodiment of the present invention, the north and east coordinates of the rotating base are calculated individually for each reservoir, and the altitude coordinate of the rotating base is dependent on the depth of the drill core fragment.

According to a preferred embodiment of the present invention, the rotating base and the drill core fragment are georeferenced by at least three targets, T1, T2, and T3, according to the equations:

$$T1_x = C_x \qquad \text{equation 1}$$
$$T1_y = C_y + \overline{CT1} \qquad \text{equation 2}$$
$$T2_x = C_x - \overline{CT2} \qquad \text{equation 3}$$
$$T2_y = C_y \qquad \text{equation 4}$$
$$T3_x = C_x + \overline{CT3} \qquad \text{equation 5}$$
$$T3_y = C_y \qquad \text{equation 6}$$
$$T1_z = T2_z = T3_z = C_z - \text{Fragment dimension} \qquad \text{equation 7}$$

wherein:

C(x, y, z): flat cartographic coordinates of the position of the drilling hole in the well;

T1, T2, and T3: photogrammetric targets;

$\overline{CT(1,2,\text{and}3)}$: distance between the center of the respective target and the center of the rotating base.

According to a further embodiment of the present invention, the north face of the drill core fragment is positioned according to T1.

According to a further embodiment of the present invention, twenty-four images are captured per fragment of the drill core.

According to another embodiment of the present invention, reconstructing the position and angle of the image includes applying the Structure from Motion (SfM) algorithm to the image with the mask applied.

According to a further embodiment of the present invention, generating a dense point cloud includes using a Multi-View Stereo (MVS) algorithm.

According to a preferred embodiment of the present invention, generating a polygonal mesh includes using a Delaunay algorithm.

According to another preferred embodiment of the present invention, performing texture processing includes matching each pixel of the image with the surface of the polygonal mesh.

According to an additional preferred embodiment of the present invention, unifying the drill core fragments includes editing a three-dimensional object that contains the vertex information, mapping textures and faces of a plurality of drill core fragments and representing the plurality of drill core fragments in a continuous manner in a single three-dimensional object.

Furthermore, according to another preferred embodiment of the present invention, a computer-readable storage media is defined comprising, stored therein, a set of computer-readable instructions, which, when executed by a computer, executes the method for generating a three-dimensional digital model of a drill core as described in the present invention.

The present invention presents a method for generating a three-dimensional digital model of a drill core, which allows the reconstruction and georeferenced 3D digital stacking of drill cores, allowing the visualization of their entire extension along the well in a single product, namely a Digital Drill Core Model (DDCM).

The main technical problem that the invention solves is how to guarantee a continuous representation of a digitalized drill core in a geometrically faithful way to how it was recovered inside the drilled well. This is guaranteed by developing a technique that performs the integration of individual fragments of drill core, using georeferencing as the main resource.

Specifically, the DDCM is characterized by a three-dimensional polygonal mesh, realistically textured from photographs, being a faithful visual and georeferenced reconstruction of the recovered drill core.

The proposed georeferencing has a planialtimetric character, that is, in addition to guaranteeing its position in the XY plane, it also preserves the Z depth dimension of each fragment of the digitized drill core, ensuring geometric and scalar fidelity with the physical drill core.

In addition, to provide this digitalization, the present invention provides for the use of a portable device, allowing it to be transported and installed wherever the drill core is stored.

BRIEF DESCRIPTION OF THE FIGURES

In order to complement the present description and obtain a better understanding of the features of the present invention, and according to a preferred embodiment thereof, a set of figures is presented as an attachment, where in an exemplified, although not limitative, manner its preferred embodiment is represented.

DETAILED DESCRIPTION OF THE INVENTION

The method for generating a three-dimensional digital model of a drill core, according to a preferred embodiment of the present invention, is described in detail below, based on the attached figures.

Figure 1:
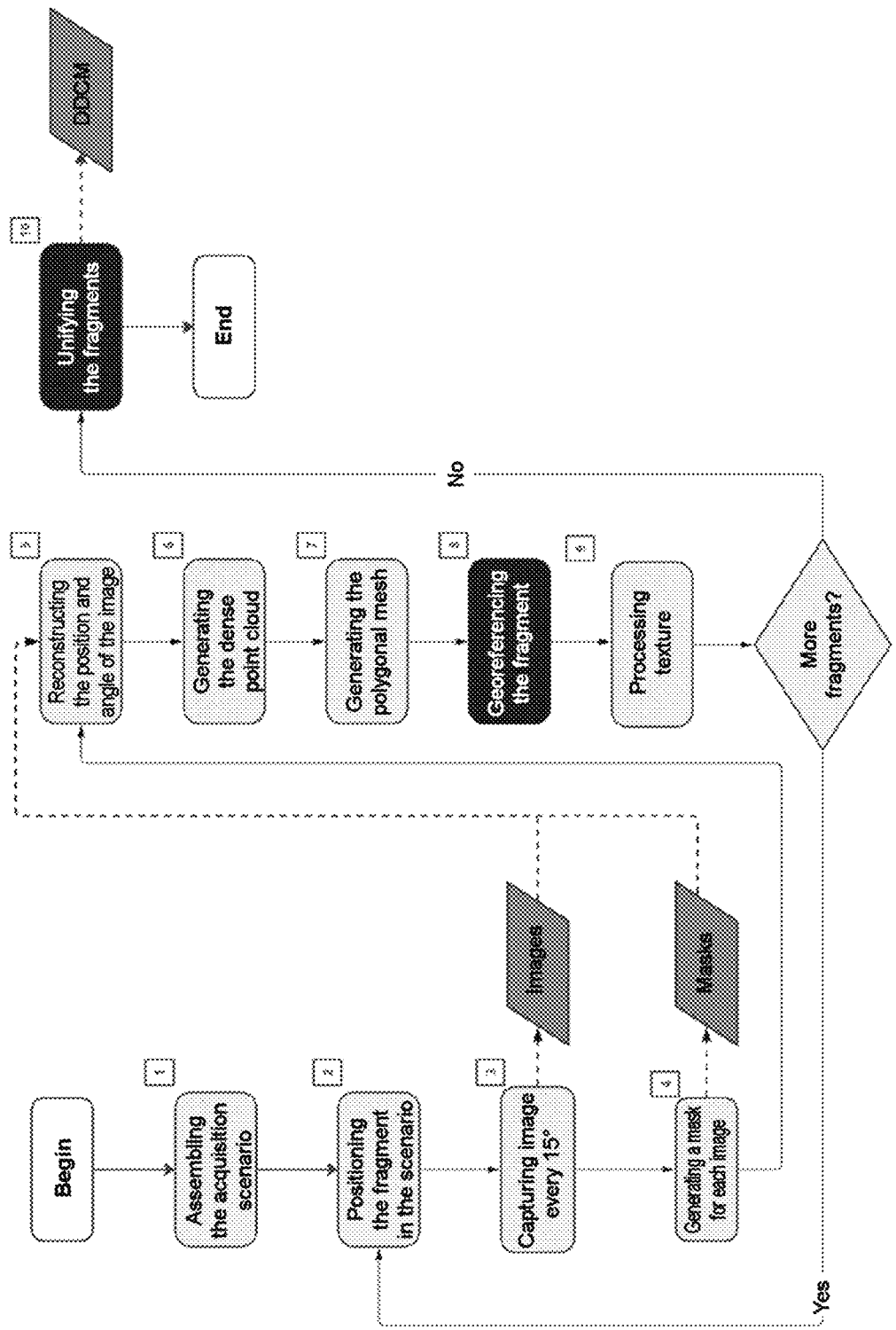
FIG. 1 shows the flowchart of the method for generating a three-dimensional digital model of a drill core.

FIG. 1 illustrates a flowchart of a method for generating a three-dimensional digital model of a drill core, according to a preferred embodiment of the present invention.

According to FIG. 1, the method for generating a three-dimensional digital model of a drill core comprises the steps detailed below.

Assembling the Acquisition Scenario (1)

Figure 2:
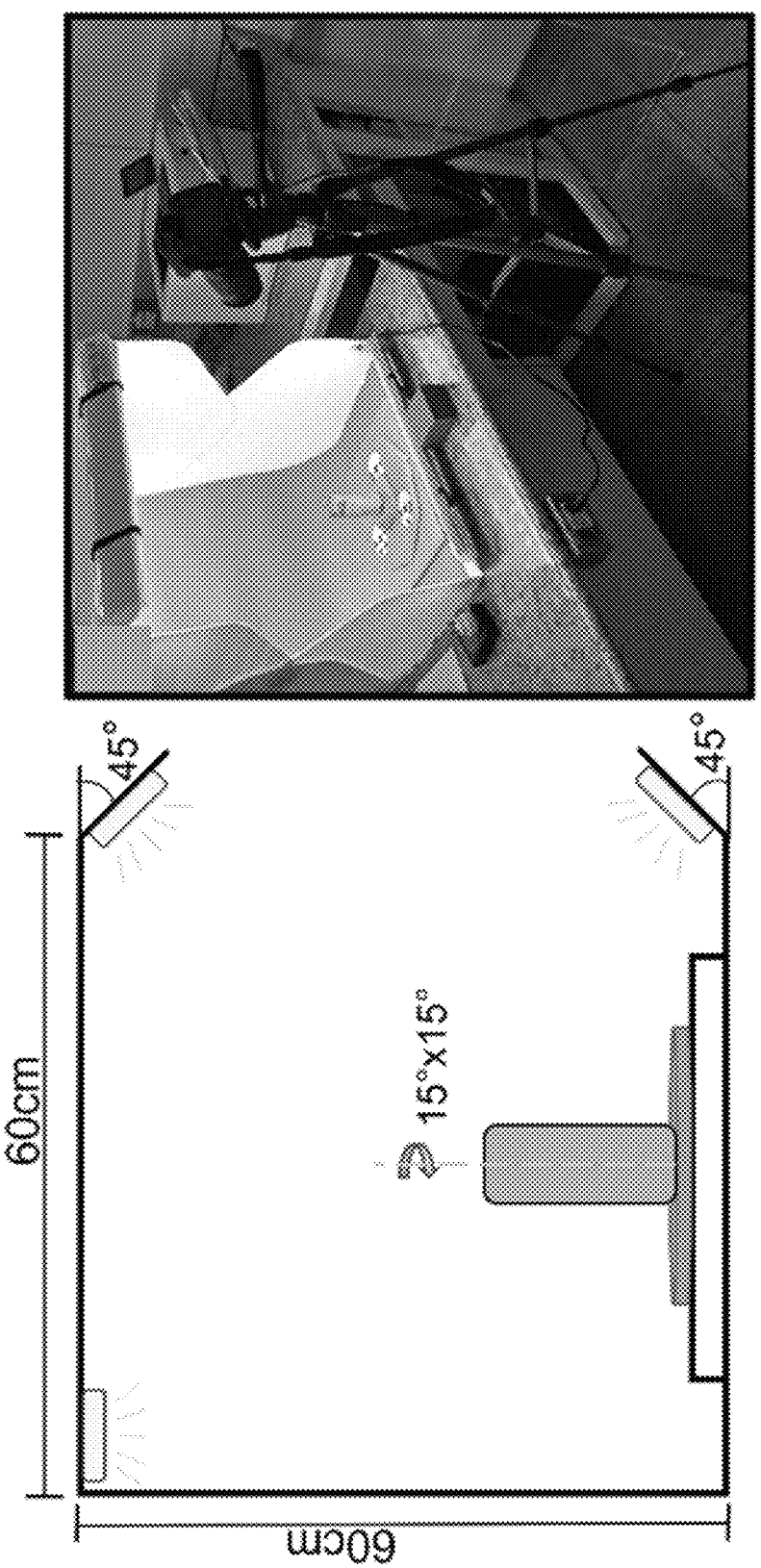
FIG. 2 presents an illustrative diagram of the acquisition scenario.

As illustrated in FIG. 2, the acquisition scenario consists of a mini cubic photographic studio measuring 30 cm to 60 cm on a side and with one of its faces open, allowing the interior to be viewed.

The cubic-shaped acquisition scenario must be made of a material that allows a movable articulation between each face, thus enabling it to be foldable for easy transportation. The cubic acquisition scenario must have an artificial lighting system that ensures homogeneous lighting inside the same.

Furthermore, a rotating base can be positioned inside the cubic photographic studio in which, in its center, the fragment of the core to be imaged will be placed.

Outside the studio, a camera must be arranged with the aid of a tripod to provide stability during the acquisition. It should be pointed at the fragment from a high angle shot (i.e., looking at the object from above) and its frame should include the fragment and the targets on the rotating base. In the camera's exposure parameters, it is recommended to set the ISO to 100, the aperture to at least 22, and adjust the shutter speed until the exposure indicated by the photometer is adequate (photometer at 0).

Positioning the Core Fragment in the Acquisition Scenario (2)

Still according to FIG. 2, the step of positioning the drill core fragment in the acquisition scenario (2) includes positioning the drill core fragment, perpendicularly, on the center of the rotating base of the acquisition scenario, so that it remains stable throughout the image acquisition.

The direction of the drill core, more specifically, the positions of its top and base as originally extracted from the reservoir, must be respected when arranging the same in the center of the rotating base, so that it is preserved in the Digital Drill Core Model (DDCM) to be obtained at the end of the method of the present invention, keeping the base of the drill core fragment in contact with the surface of the rotating base.

In particular, in some cases, it is desired to also maintain the orientation of the core, which can also be preserved in the DDCM thanks to the georeferencing of the rotating base.

The rotating base is georeferenced by means of three (03) targets/markers, each containing the north, east and altitude coordinates (within a flat/projected coordinate system) of the same. The north and east coordinates of the rotating base are individually calculated according to each reservoir or well. In turn, the altitude coordinate of the rotating base varies for each drill core fragment, according to its depth dimension.

More specifically, the center of the rotary table, where the drill core fragment is positioned, has the same coordinate collected in the field at the time of drilling the well, in UTM X (Easting) and Y (Northing) flat coordinates.

Figure 3:
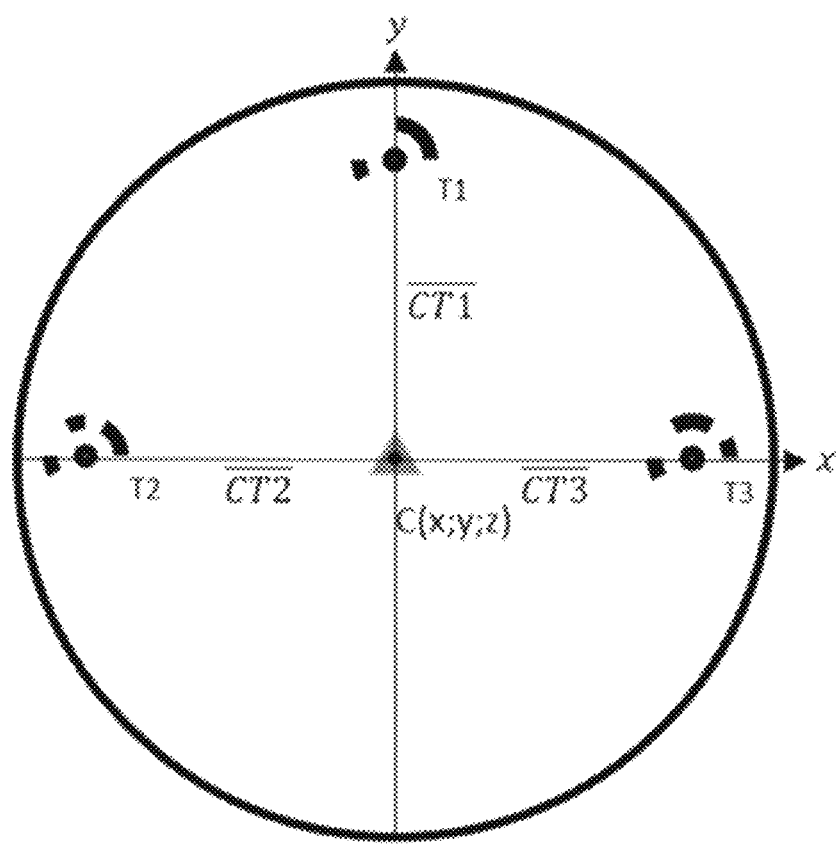
FIG. 3 illustrates the scheme of the georeferenced coordinate plane for the digitalization base.

FIG. 3 illustrates a scheme of how the coordinate plane should be arranged and how it is calculated.

When working with a georeferenced system, each drill core fragment is linked to its proper global spatial position within the virtual space, thus making its stacking with neighboring fragments occur naturally.

According to FIG. 3, there can be seen:

$$T1_x = C_x \qquad \text{equation 1}$$

$$T1_y = C_y + \overline{CT1} \qquad \text{equation 2}$$

$$T2_x = C_x - \overline{CT2} \qquad \text{equation 3}$$

$$T2_y = C_y \qquad \text{equation 4}$$

$$T3_x = C_x + \overline{CT3} \qquad \text{equation 5}$$

-continued $$T3_y = C_y \qquad \text{equation 6}$$

$$T1_z = T2_z = T3_z = C_z - \text{Fragment dimension} \qquad \text{equation 7}$$

wherein:
C(x, y, z): flat cartographic coordinates of the position of the drilling hole in the well;
T1, T2, and T3: photogrammetric targets;
$\overline{CT(1,2,\text{and}3)}$: distance between the center of the respective target and the center of the rotating base.

In this case, considering that target T1 in FIG. 3 represents the geographic north, it is sufficient for the north face of the drill core fragment to be positioned respecting this criterion.

Furthermore, to obtain the coordinates of targets T1, T2, and T3, it is necessary to add (if to the right of the center) or subtract (if to the left of the center) the value of this coordinate from the distance measured between the center of the rotary table and the target in question, in meters.

Since the well is represented by a single XY coordinate, due to its vertical aspect, the target coordinates are repeated for all drill core fragments, changing only their Z value, which is the dimension of the respective drill core fragment.

The Z coordinate of the drill core fragment is obtained at the time of core recovery and recorded by marking plates that are distributed along the box where the core is stored.

Accordingly, any fragment available in the box can have its dimension calculated by adding the distance measurement from the last marking plate to the base of the fragment in question. This method is the standard used in the industry for measuring the core dimension. However, this dimension is referenced to the surface from which the well was drilled, increasing as the well deepens. In this way, to obtain the georeferenced altitude value, it is sufficient to subtract the ellipsoidal altitude coordinate Z, collected during the well location step in the field, from the dimension of the fragment obtained by means of the storage box, obtaining the Z value for targets T1, T2, and T3 of the fragment in question. This altitude value must be calculated again for each fragment, considering that no fragment has the same dimension.

Capturing Images of the Drill Core Fragment (3)

An image must be captured every 150 of rotation of the rotating base axis, resulting in 24 photos per drill core fragment.

This value provides an overlap between consecutive photographs that favors the reconstruction of the fragment with a satisfactory quality.

The base is interconnected with the camera in such a way that, at the end of each rotation, an electrical pulse is sent so that the camera takes the shot. Although it is recommended that the rotation be automatically done, to avoid human interference and speed up the process, it is also possible to do it manually.

Generating a Mask for Each Captured Image (4)

Generating a mask for each captured image (4) involves excluding all information other than the drill core fragment within the image.

In addition to reducing processing time, this step increases the algorithm's success rate in aligning the cameras, and results in a noise-free product.

The mask can be manually or automatically drawn by means of computational techniques, the latter being the case in the present technique.

Reconstructing the Image Position and Angle (5)

The images with the mask applied are subjected to a Structure from Motion (SfM) algorithm responsible for reconstructing their position and angle at the time of capture in the three-dimensional virtual space. This is done from homologous points found from overlapping photographs. These points form the sparse point cloud.

Generating a Dense Point Cloud (6)

From the calculation of the interior and exterior orientation parameters of the cameras, obtained by the SfM algorithm, the depth maps are generated using Multi-View Stereo (MVS) algorithms. With this information, the dense point cloud is generated, allowing the photographed object to be represented more clearly by densifying the points.

Generating a Polygonal Mesh (7)

To generate the polygonal mesh, the dense cloud goes through the Delaunay triangulation algorithm, which processes a solid surface from the point cloud. The resolution of the polygonal mesh must have an adjusted number of faces without losing the visual quality. According to the obtained results, a resolution of between 5 and 10K faces per fragment is recommended, depending on the complexity of the fragment topology.

Georeferencing the Drill Core Fragment (8)

Specifically, the drill core fragment is georeferenced by using the artificial targets present in the photographs, as shown in FIG. 3.

Each target must have a coordinate value within the official Reference System (in the case of Brazil, the Geocentric Reference System for the Americas 2000-SIRGAS2000), projected in a cartographic projection system appropriate for the region where the well was drilled, in which case the Universal Transverse Mercator (UTM) projection is very common.

In particular, the target coordinates must be calculated based on the well coordinate, obtained at the time of drilling.

Due to the vertical characteristic of the core, the planimetric values (X and Y) of the coordinates will be repeated for all fragments, and the only value that must be changed refers to the dimension of the fragment (Z).

This georeferencing step is repeated for each drill core fragment.

Furthermore, as will be seen later, in step 10, the stacking is actually obtained with all the fragments. If the well has a direction other than vertical, mathematical adaptations must be made.

Performing Texture Processing (9)

In order for the 3D model to have a photorealistic appearance, a texturing algorithm is used. This algorithm is responsible for generating the UV map of the model, matching each pixel of the images with the surface of the polygonal mesh.

According to tests conducted, a texture resolution of 2K to 4K is recommended for each fragment.

Unifying the Drill Core Fragments (10)

After repeating steps (2) to (9), previously described, for each drill core fragment, the fragments are joined using a junction tool, which groups the various polygonal meshes individually processed into a single 3D three-dimensional object within the same reference system.

Due to the georeferencing performed for each drill core fragment (performed in step 8), they are automatically stacked, with each fragment positioned at its proper dimension within the well.

Regarding the joining process, this involves editing a 3D object that contains the vertex information, mapping textures and faces of all fragments, with each drill core fragment consisting of a grouping of faces and the DDCM consisting of all groups of fragments.

In general, the joining tools have the functionality of joining separate 3D objects.

It is also worth highlighting that, due to the appropriate and correct positioning of each fragment, the objects are a continuous (stacking) and faithful representation of the physical core in a single 3D object.

In a complementary way, the present invention relates to a computer-readable storage media that comprises, stored in itself, a set of computer-readable instructions, in which, when the set of computer-readable instructions is executed by one or more processors, the one or more processors implement the method for generating a three-dimensional digital model of the drill core, as described above.

In particular, the computer-readable storage media may be a memory, wherein the memory may be of non-volatile type, such as a hard disk drive (HDD) or a solid-state drive (SSD), or it may be a volatile memory, such as a random-access memory (RAM). The computer-readable storage media may be any other medium or media that can transport or store the expected program code in the form of an instruction or a data structure or a set of instructions, and can be accessed by one or more computers or one or more processors, but is not limited to the same. The computer-readable storage media alternatively may be a circuit or any other apparatus that can implement a storage or transport function.

Specifically, the set of computer-readable instructions represents the algorithm or computer program code or a data structure that performs the method for generating a three-dimensional digital model of a drill core, as described above.

The processor may be a general purpose processor, which may be a microprocessor or any conventional processor or similar.

Examples and Results of the Invention

Figure 4:
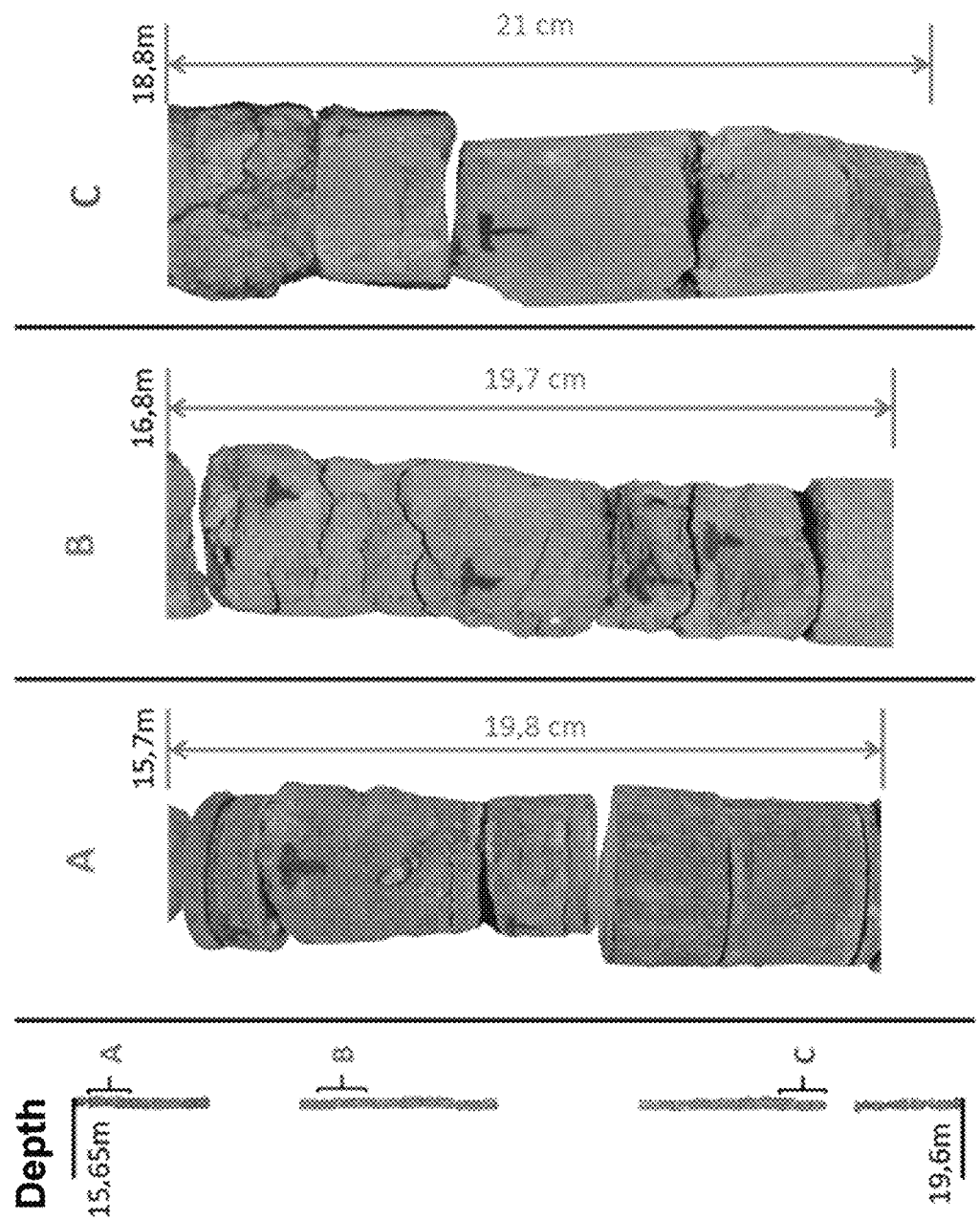
FIG. 4 presents a three-dimensional digital model of a drill core (DDCM) of an example of application of the method of the present invention.

In an example of application of the method of the present invention, a drill core was recovered from a basin from a drilling procedure. The core was recovered from a drilling performed in a mine with a length of 3.6 m, the result of which is shown in FIG. 4.

In an additional example of application of the method of the present invention, four drill cores were digitized from wells with the following lengths: 48 m, 33 m, 25 m and 12 m. All wells come from exploration pits.

Figure 5:
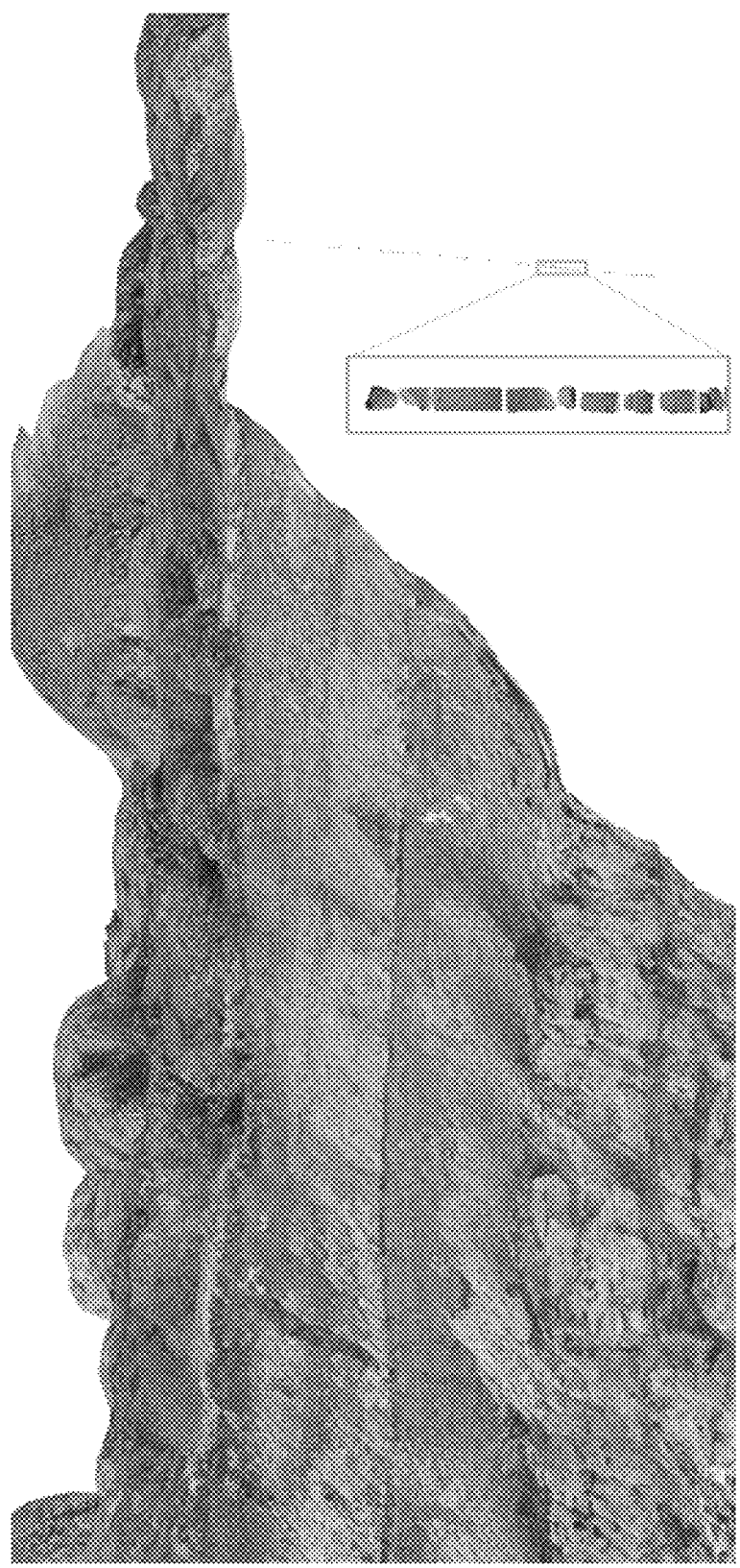
FIG. 5 represents a three-dimensional digital model of a drill core (DDCM), digitally integrated with its respective digital outcrop model (DOM), of a second example of application of the method of the present invention.

FIG. 5 illustrates drill cores reconstructed and joined into a three-dimensional digital drill core model (DDCM) and how it is possible to perform a geospatially reliable integration with other types of data, such as a digital outcrop model (DOM).

By implementing the method of the present invention, it is expected that it will be possible to generate a single digital data that represents the entire continuity of a drill core in a manner consistent with its geometric arrangement within the well from which it was recovered. This has the advantage of providing a new type of multi-scale digital data integration, adding the three-dimensional and photo-realistic drill core within a virtual environment, namely the Digital Drill Core Model (DDCM).

In this way, it is possible to incorporate the DDCM into software commonly used in the industry for viewing and interpreting 3D data, as additional information for geologists and engineers to assist in decision-making and data correlation. Because it is georeferenced, its position and scale are consistent with reality, thus allowing structural analyses and geometric correlations with other three-dimensional data, such as DOMs.

More particularly, if georeferencing is not considered in the method, each digital fragment is generated within a local and independent coordinate system that does not communicate with each other. In this way, a manual process of digital stacking of non-georeferenced fragments would require effort and time, such that it could make the overall process unfeasible. In this regard, bearing this difficulty in mind, the method of the present invention is capable of enabling stacking by automating this task.

In addition, the suitability of the acquisition process for a portable solution can also be considered an advantage and contribution, since current equipment has a transportation limitation. The solution based on the reconstruction technique known as SfM/MVS Photogrammetry consists of lightweight and foldable materials, allowing for easy packaging and transportation of the same. These materials correspond to a mini photography studio with a homogeneous lighting set and a rotating base to house the core fragment. The system for acquiring the images is conventional, consisting of a digital camera and a tripod, also easy to transport. FIG. 2 illustrates how this system is assembled to perform the acquisition of the fragments.

The technique involved in the method of the present invention was designed to be applied specifically to drill cores, with its result directly dependent on the quality of recovery from the well and the integrity of the rock. It is important that the rock is in a firm state that is consistent enough to be able to position the same on a rotating base, where the capture of the photographs is carried out. In the case of very fragmented or intensely altered rocks, these are not eligible to be contemplated by this technique or any other current technique that has as its purpose the 3D digitization of drill cores.

Those skilled in the art will value the knowledge presented herein and will be able to reproduce the invention in the presented embodiments and in other variants, encompassed by the scope of the attached claims.

The invention claimed is:

1. A method for generating a three-dimensional digital model of a drill core, comprising the steps of:
positioning at least one drill core fragment, perpendicularly, on the center of at least one rotating base of an acquisition scenario, obeying the original lower and upper extraction positions of the drill core fragment from the reservoir;
wherein the original position of the base of the drill core fragment is arranged in contact with the surface of the rotating base;
wherein the rotating base is georeferenced by means of the north, east and altitude coordinates;
capturing images of the drill core fragment, in which an image is captured every 15° of rotation of the rotating base axis;
generating a mask for each captured image, including exclusion of all information other than the drill core fragment within the image;
reconstructing the position and angle of the image;
generating at least one dense point cloud;
generating at least one polygonal mesh;
georeferencing the drill core fragment;
performing texture processing; and
unifying a plurality of drill core fragments, including grouping the generated polygonal meshes into a single three-dimensional object within the same geographic reference system.

2. The method according to claim 1, wherein the acquisition scenario has a cubic shape with one of the faces open, and comprises an artificial lighting system and at least one stably positioned camera.

3. The method according to claim 1, wherein the north and east coordinates of the rotating base are individually calculated for each reservoir, and the altitude coordinate of the rotating base is dependent on the depth of the drill core fragment.

4. The method according to claim 1, wherein the rotating base and the drill core fragment are georeferenced through at least three targets, T1, T2, and T3, according to the equations:

$$T1_x = C_x \quad \text{equation 1}$$
$$T1_y = C_y + \overline{CT1} \quad \text{equation 2}$$
$$T2_x = C_x - \overline{CT2} \quad \text{equation 3}$$
$$T2_y = C_y \quad \text{equation 4}$$
$$T3_x = C_x + \overline{CT3} \quad \text{equation 5}$$
$$T3_y = C_y \quad \text{equation 6}$$
$$T1_z = T2_z = T3_z = C_z - \text{Fragment dimension} \quad \text{equation 7}$$

wherein:
C(x, y, z): flat cartographic coordinates of the position of the drilling hole in the well;
T1, T2, and T3: photogrammetric targets;
$\overline{CT(1,2,\text{and}3)}$: distance between the center of the respective target and the center of the rotating base.

5. The method according to claim 4, wherein the north face of the drill core fragment is positioned according to T1.

6. The method according to claim 1, wherein twenty-four images are captured per fragment of the drill core.

7. The method according to claim 1, wherein reconstructing the position and angle of the image includes applying the Structure from Motion (SfM) algorithm to the image with the mask applied.

8. The method according to claim 1, wherein generating a dense point cloud includes using a Multi-View Stereo (MVS) algorithm.

9. The method according to claim 1, wherein generating a polygonal mesh includes using a Delaunay algorithm.

10. The method according to claim 1, wherein performing texture processing includes matching each pixel of the image with the surface of the polygonal mesh.

11. The method according to claim 1, wherein unifying the drill core fragments includes editing a three-dimensional object that contains vertex information, mapping textures and faces of a plurality of drill core fragments, and representing the plurality of drill core fragments in a continuous manner in a single three-dimensional object.

12. A computer-readable storage media, comprising stored therein, a set of computer-readable instructions, which, when executed by a computer, executes the method as defined in claim 1.

* * * * *